: Patent Number: 5,283,516
[45] Date of Patent: Feb. 1, 1994

[54] LOW VOLTAGE DIMMER WITH NO LOAD PROTECTION

[75] Inventor: Warren G. Lohoff, San Antonio, Tex.

[73] Assignee: Pass & Seymour Legrand, San Antonio, Tex.

[21] Appl. No.: 21,753

[22] Filed: Feb. 24, 1993

[51] Int. Cl.⁵ ............................................. G05F 1/40
[52] U.S. Cl. .................................. 323/322; 323/241; 323/242; 323/326
[58] Field of Search ............... 323/239, 241, 242, 322, 323/326, 904, 905; 315/225, 360, 292, 293, 119

[56] References Cited

U.S. PATENT DOCUMENTS

| | | | |
|---|---|---|---|
| 4,275,445 | 6/1981 | Di Pietro Elizaran | 364/480 |
| 4,287,468 | 9/1981 | Sherman | 323/322 |
| 4,466,039 | 8/1984 | Moran et al. | 361/35 |
| 4,654,806 | 3/1987 | Poyser et al. | 364/551 |
| 4,757,797 | 7/1988 | Bengtsson | 123/602 |

Primary Examiner—Steven L. Stephan
Assistant Examiner—Y. Jessica Han

[57] ABSTRACT

A low voltage dimmer is shown with the dimming function being on a primary side of a low voltage transformer. Live voltage feeds through a triac to the primary side of the transformer with the gate for the triac being controlled by a microprocessor. To prevent burnout of the transformer if the secondary load side is open, zero crossing of the incoming signal is determined by the microprocessor. If the time constant between the zero crossing of the live voltage and the charging of a capacitor with resistance being provided by the primary side of the transformer exceeds w predetermined time period, the microprocessor will be inhibited from generating a pulse to fire the triac. When the primary side of the transformer has been opened, the load on the secondary side can be re-established, i.e. light bulb replaced. Power for the microprocessor is from the charging of a capacitor used to provide the triggering signal to the microprocessor. Also the microprocessor may be triggered from remote locations.

13 Claims, 6 Drawing Sheets

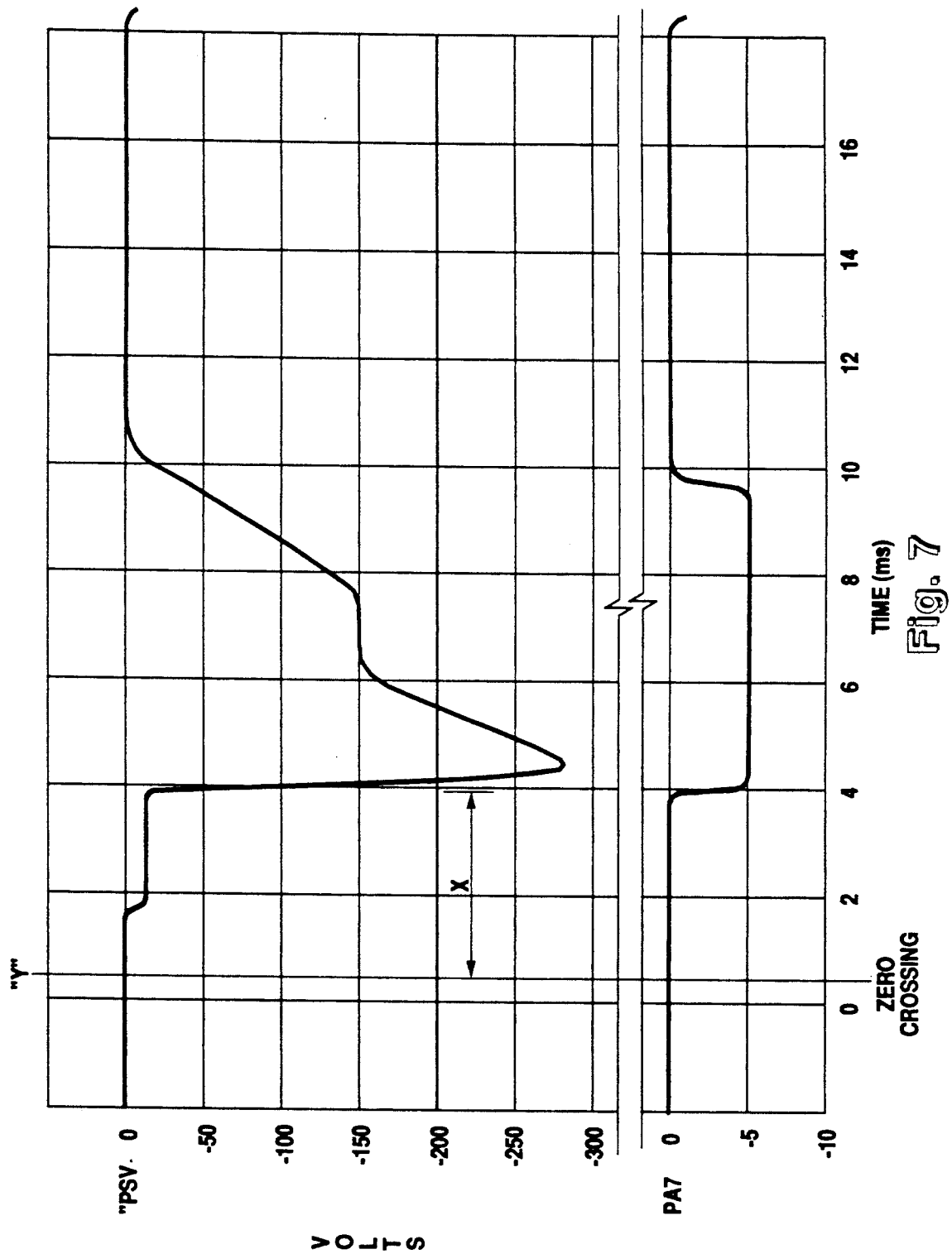

LOW VOLTAGE DIMMER WITH NO LOAD PROTECTION

BACKGROUND OF THE INVENTION

1. Field of the Invention

This invention relates generally to low voltage dimmers and, more particularly, to use of a microprocessor to prevent burn-out of a low voltage transformer. If the load on the secondary side of the low voltage transformer is open, the time constant is increased. This increase in time constant is determined by the computer, which after one half cycle shuts the entire circuit down to allow the load to be re-established and power to be re-applied.

2. Description of the Prior Art

A typical low voltage light dimming circuit utilizes a primary and secondary winding of a transformer. The voltage is stepped down from the primary winding to the secondary winding, which then connects across the load, such as a light bulb. If the light bulb burns out, a DC voltage may be applied to the primary side of the transformer which would cause high current flow through the transformer. The high current flow will cause high temperatures in the transformer and possibly burn up the transformer. The typical solution in the past has been to fuse the circuit so that if high current flow exists, the fuse will blow. Another alternative is to install temperature shut-down devices. If the transformer gets too hot, the temperature switch will activate to open the circuit. Most manufacturers of low voltage dimmers specify that the loads to be used with the dimmers must be equipped with some form of protection such as a fuse or a temperature control device.

Generally it is well known to use the firing of a triac to control the amount of current being delivered to a load. A triac may be located either on the primary or secondary side of a low voltage transformer. Also, it is well known to use a solid state control circuit to control the phase angle at which the triac is fired. The earlier in each half cycle the triac is fired, the more power delivered to the load. If the load is a light, the brighter the light, the earlier the firing of the triac.

Concerning high voltage transformers, microprocessors have been used in the past to monitor a large number of parameters to determine what is occurring in the transformer. A typical such on-line power transformer is shown in U.S. Pat. No. 4,654,806 to Poyser. In Poyser, the microprocessor is used to collect numerous parameters concerning the transformer, but there is no indication of sensing time intervals between certain events such as the zero crossing and the next firing of a triac. Basically, Poyser simply teaches the use of the microprocessor to monitor transformers in a power line application. This is not the same type of application as low voltage light dimming.

Probably the best art known by the Applicant is U.S. Pat. No. 4,287,468 by Sherman, which is illustrative of a sizable body of art using microprocessors and dimmer circuits. Sherman shows the use of a microprocessor that counts the number of cycles of power being applied to the load as a part of the dimming technique. Also, a circuitry to check dimmer status is provided. However, Sherman does not show the use of a microprocessor to determine the time between a zero crossing and firing of a triac, and if it has not fired in a time interval, to fire the triac for that half cycle. Thereafter, current flow is removed until the open secondary transformer has been reconnected.

Generally it is well known to use a microprocessor to calculate time delays in various types of electrical devices as is shown in U.S. Pat. No. 4,275,445 to Di Pietro. However, none of the prior art devices known to Applicant are used to measure the time delay in firing of a triac based upon the increased impedance caused by an open secondary transformer that should, but does not, have a load thereacross.

SUMMARY OF THE INVENTION

It is the object of the present invention to provide a low voltage light dimming switch.

It is another object of the present invention to provide a low voltage light dimming switch with transformer protection in the event secondary winding is open.

It is yet another object of the present invention to use a microprocessor to prevent damage to the transformer of a low voltage light dimming switch if the secondary of the transformer is open.

It is still another object of the present invention to control the gating of a triac in line with the primary side of a transformer for a low voltage dimmer, which gating of the triac is computer controlled.

In normal operation AC voltage is applied across a triac. When a signal is received by a microprocessor to turn on the light dimming switch, the microprocessor will first determine the zero crossing of voltage being received across the triac. Thereafter, during normal operation, an RC time constant provides for the charging time of a capacitor. The R part of the RC time constant is the primary winding of the load transformer, while the C is the power supply capacitor. Once the capacitor is fully charged, a signal is sent to the microprocessor which enables the microprocessor to fire the triac at the phase angle for which it has been programmed.

The firing of the triac allows for current to flow to the primary winding of the transformer which provides for the low voltage dimming on the secondary side of the transformer. Thereafter, during each half cycle, the microprocessor will fire the triac only after the capacitor is fully charged. By appropriate signals being sent to the microprocessor, the phase angle of the firing of the triac can be raised or lowered. This value is then stored in memory and becomes the pre-set light level.

In the event the secondary of the low voltage transformer is open, the RC time constant that results from the increased impedance of the transformer is also increased. Therefore, when an attempt to turn the light dimmer on by an appropriate signal to the microprocessor, the microprocessor will first determine the zero crossing of the wave form. Next, the microprocessor will measure the elapsed time between the zero crossing and the above RC signal. If the time constant now exceeds the threshold, the microprocessor will be inhibited from generating a pulse to fire the triac. No power at any time will be delivered to the primary side of the load. The microprocessor will continue to not send a firing pulse to the triac until after the circuit has been powered down and power re-applied. Hopefully, during the time the circuit is powered down, the load (i.e. light bulb) would be replaced on the secondary side of the transformer. If the load is not replaced, upon powering back up, the microprocessor would again determine that the impedance of the primary of the transformer had increased due to the open secondary and would not fire the triac again.

The circuit also provides for remote control of the microprocessor. In other words, there may be up to five remotes controlling a single load. All of these remotes are connected to one point through the microprocessor to determine whether to fire the triac and deliver current to the primary of the load transformer.

Normally-open switches may also be closed for short time intervals so that the microprocessor will clock either up or down the phase angle at which the triac is fired. This in turn will raise or lower the intensity of the light connected to the secondary side of the light dimming transformer. Likewise, a plurality of light emitting diodes may be connected to the microprocessor to indicate the intensity level of the light being generated by the load. Because the microprocessor has a memory, once the switch is turned off, upon turning the switch back on, it will come back to the same intensity level as when it was turned off.

For safety requirements and as required by Underwriters Laboratory, a full off switch is also provided in line with the circuit. The full off switch would normally be open prior to replacing the load, i.e. light bulb. Thereafter, the full off switch would again be closed to allow for the normal operation of the light dimming switch.

The power that is used to drive the microprocessor is received from the negative portion of the AC voltage received across the triac prior to firing. The negative portion of the signal charges a capacitor, which capacitor continues to operate the microprocessor through a voltage regulator.

BRIEF DESCRIPTION OF THE DRAWINGS

FIG. 7 is a typical first wave form of the light dimmer switch when the switch is operating and the secondary winding is open.

DESCRIPTION OF THE PREFERRED EMBODIMENT

Figure 2:
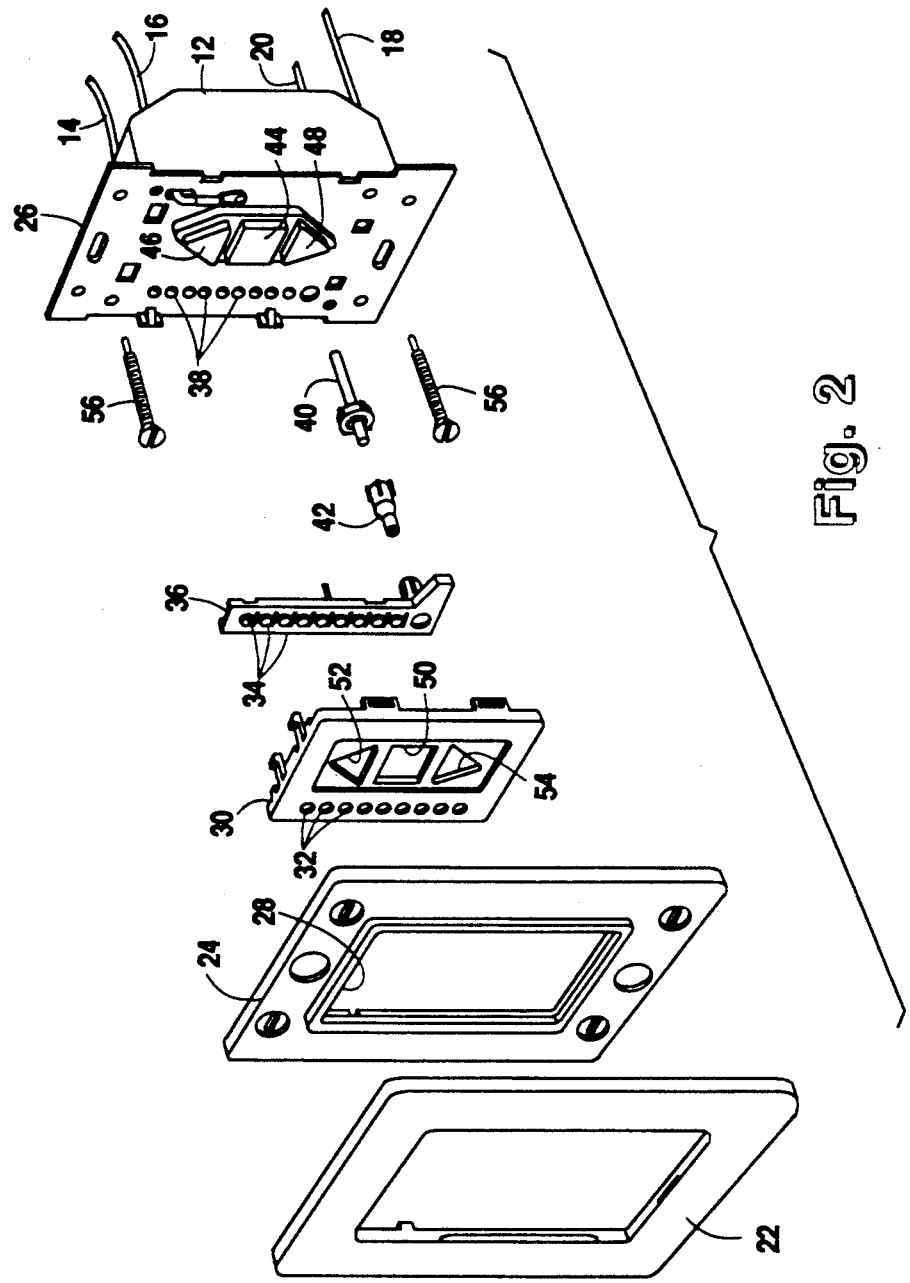
FIG. 2 is an exploded perspective view of the front panel portions of the light dimming switch embodying the present invention.
Figure 1:
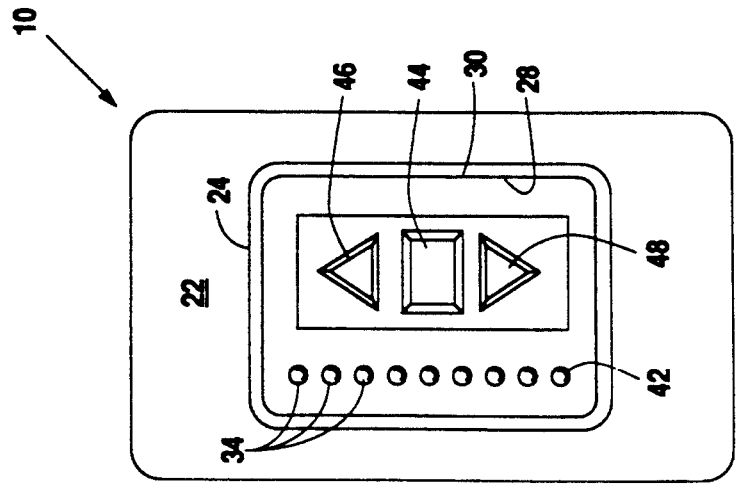
FIG. 1 is a front elevation view of the light dimming switch as assembled and ready for installation.

Referring to FIGS. 1 and 2 in combination, there is shown a low voltage light dimming switch illustrated generally by a face plate 10 and housing 12. The electrical leads include black line voltage input 14, red line load connection 16, green line chassis ground 18, and yellow line remote connection 20.

The face plate 10 includes an outer face plate 22 that snaps into place over inner face plate 24. The inner face plate may be held to the strap 26 by screws (not shown), which screws are covered by the outer face plate 22. Contained within the opening 28 of the inner face plate 24 is the control panel cover 30.

The control panel cover 30 has nine small circular openings 32 vertically aligned on the left hand side of the control panel cover 30. The top eight of the small circular openings 32 receive therein lens 34 from lens strip 36. The lens 34 are constructed to match up with the eight vertically aligned emitting diodes 38 as contained behind strap 26.

The bottom opening 33 receives therethrough a push-push switch rod 40 and retainer 42. The retainer 42 will stick through bottom opening 33 in a manner that appears almost the same as one of the lens 34 for the light emitting diodes 38. However, the retainer 42 may be pushed which will in turn push the push-push switch rod 40 to open or close the entire circuit for the light dimming switch in a manner that will be subsequently described.

Mounted on the front of the strap 26 is the on/off button 44, increase in light intensity button 46, and decrease in light intensity button 48. Each of the buttons 44, 46, and 48 are received in the respective openings 50, 52, and 54 of the control panel cover 30.

After the light dimming switch is properly installed and power applied to the black line voltage input 14, all that is necessary to make the low voltage light dimmer operational is the pushing of retainer 42, which will turn on the full on/off switch as will be subsequently described in more detail. In normal operation inside of a home, retainer 42 will be pushed in and remain in except to provide a full off when changing light bulbs or similar types of activity requiring a full off condition.

Assuming a person decides to turn on the lights, on/off button 44 is pushed. When the lights come on, if the intensity level is too low, the person can increase the intensity level by pushing increase in light intensity button 46. Likewise, to decrease the light intensity, a person can decrease the light intensity by pushing the decrease in light intensity button 48. The vertical arrangement of light emitting diodes 38 will begin to light up with the lowest intensity being only the lower light emitting diode being lit and with the maximum intensity being all eight light emitting diodes being lit during normal operation. Thereafter, the low voltage light dimmer can be turned off by pushing the on/off button 44. By again pushing the on/off button 44, the dimmer is turned on to at the last intensity level previously set into the light dimming switch.

Figure 4:
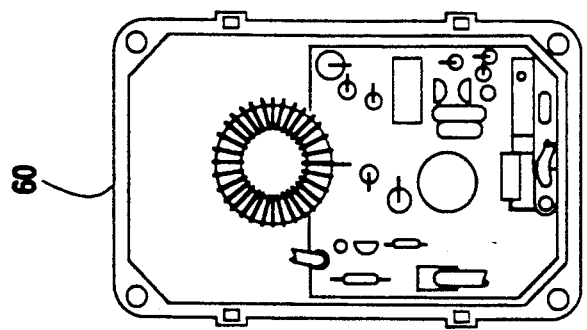
FIG. 4 is a rear elevational view of the circuit board containing the circuit electronics.
Figure 3:
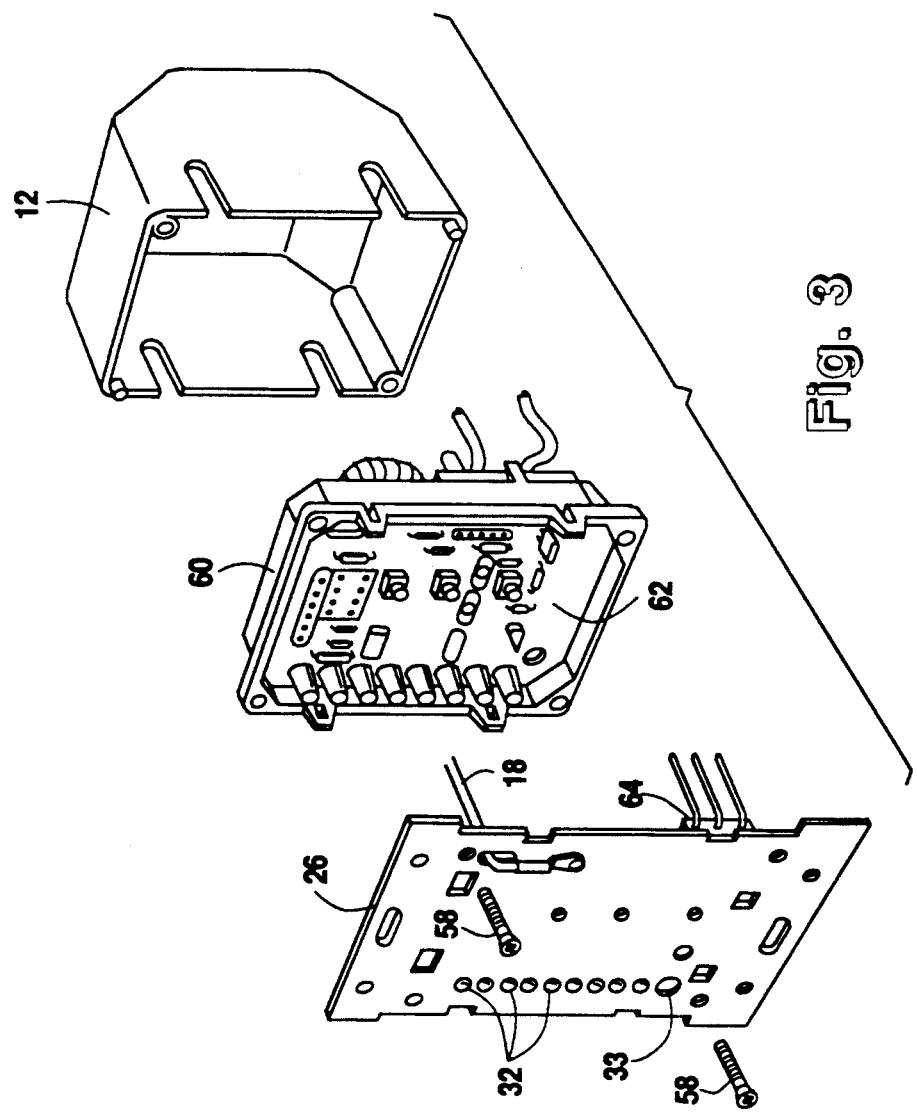
FIG. 3 is an exploded perspective view of the internal electronics embodying the present invention.

Screws 56 in FIG. 2 hold the strap 26 and entire light dimming switch to the switch box (not shown). Screws 58 as shown in exploded perspective of FIG. 3 hold the strap 26 to the housing 12. Held in position between housing 12 and strap 26 is a circuit board frame 60. Mounted within the circuit board frame 60 is the circuit board 62 with electrical components being mounted on both the front and back as can be seen in FIGS. 3 and 4. Connected to the strap 26 is green line chassis line 18. Also, for heat dissipation purposes, a triac 64 is mounted to the strap 26 before connection to the electrical components contained on circuit board 62 during assembly. Triac 64 is the main power switching device contained in the light dimming switch.

Figure 5A:
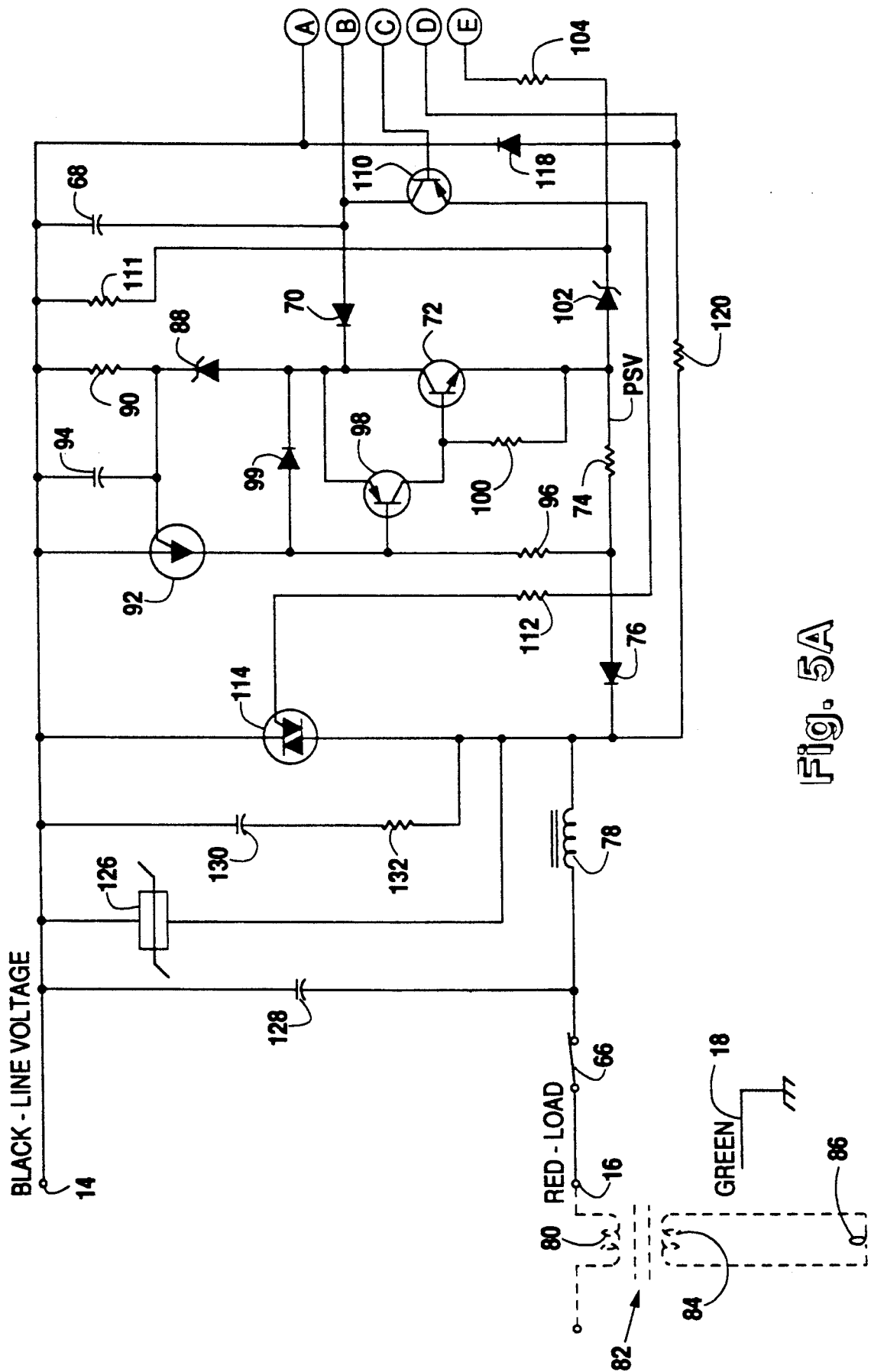
FIG. 5A and 5B are detailed electrical schematic of an electronic light dimming switch embodying the present invention.
Figure 5B:
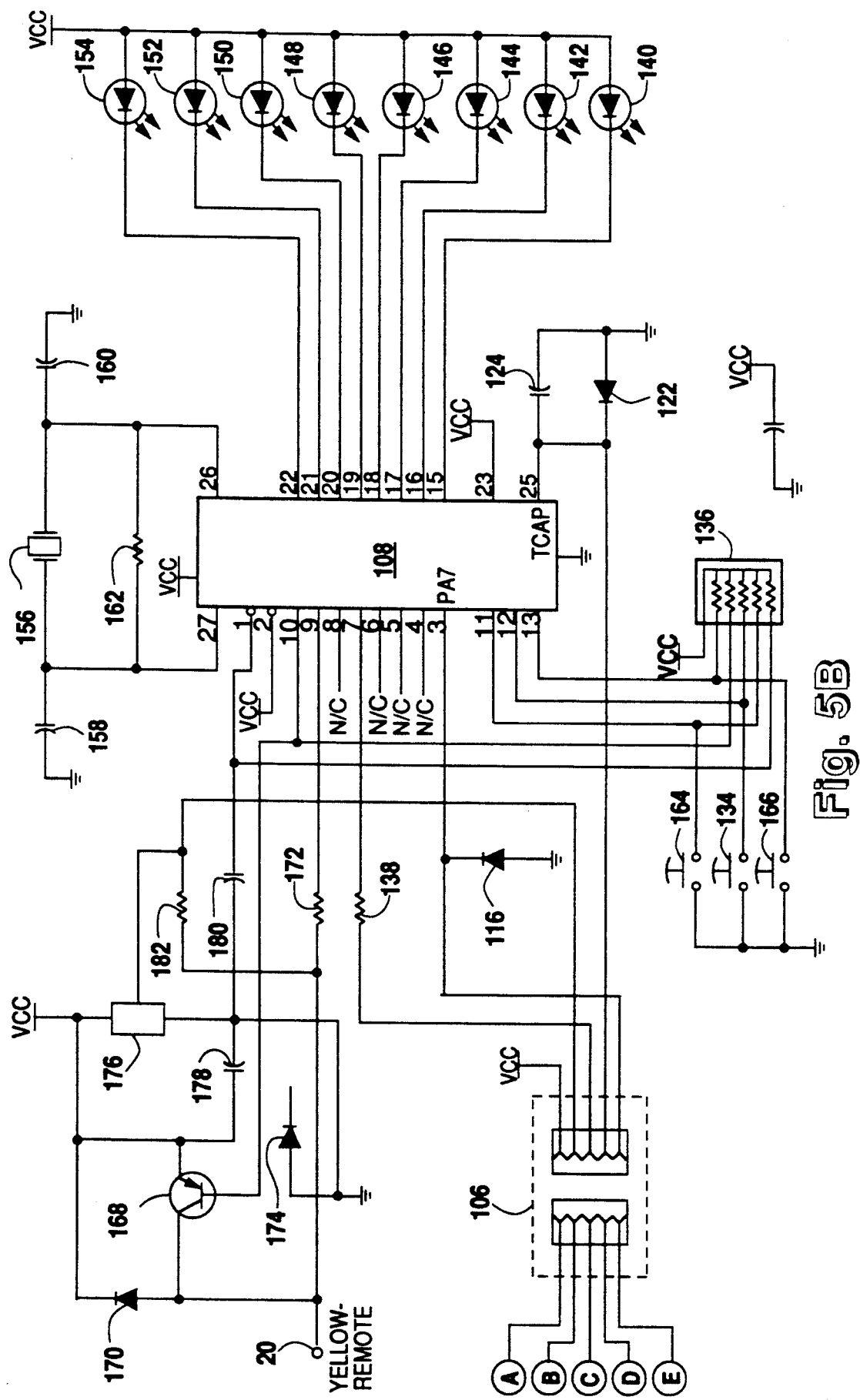

Referring to FIGS. 5A and B in combination, the detailed electrical schematic of the low voltage light dimming switch is shown. Like numbers as used to refer to like components will again be used. The black line input voltage 14, red line load connection 16, green line chassis ground 18, and yellow line remote connection 20 are connected as shown in FIG. 5. Voltage is applied between the red load connection 16 and the black line voltage connection 14 with the current being limited by the low voltage transformer 82. After the AC voltage crosses zero in a negative going direction, current will flow through power capacitor 68, diode 70, transistor 72, 100 ohm resistor 74, diode 76, and inductor 78 to the load connection 16. While not forming a part of this invention, the load connection 16 connects through the primary side 80 of the low voltage transformer 82. The secondary side of the low voltage transformer 82 connects to a typical load 86 such as a light.

Connected across the power capacitor 68 is a 12 volt zener 88 in series with 1000 ohm resistor 90. When the power capacitor 68 has charged up to 12 volts, 12 volt zener 88 breaks down and begins to conduct. Conduction of zener 88 develops a voltage across resistor 90 which acts as an input signal to the programmable unijunction transistor (PUT) 92 to start conduction therethrough. Gate capacitor 94 maintains the programmable unijunction transistor 92 in the on state during that half cycle. The firing of the PUT 92 generates a voltage across 22,000 ohm resistor 96 which generates a base voltage on PNP resistor 98 thereby causing it to conduct. The conduction of the transistor 98 turns off transistor 72 by maintaining a voltage across 1000 ohm resistor 100.

Simultaneously, 30 volt zener diode 102 breaks down and begins to conduct thereby allowing current flow through 1 meg ohm current limiting resistor 104 through connector 106 to PIN 3 (PA 7) of the microprocessor 108. While many different types of microprocessors may be used, the microprocessor selected is an MC68HC05P1DW manufactured by Motorola. The firing of the PUT 92, which is caused by the completion of the charging of the power capacitor 68, is sensed in the microprocessor 108. The firing of the PUT 92 should occur within a predetermined time interval of the zero crossing of the line voltage in the negative direction. An internal register called preset in the microprocessor 108 contains a value between zero and 85 that represents the phase angle at which the triac is to be fired at. A self contained timer in the microprocessor then allows the correct amount of time to lapse between the zero crossing and the value in the preset register. A 50 microsecond firing pulse is then sent from PIN 7 through connector 106 to the base of transistor 110. Transistor 110 begins to conduct and through 22 ohm resistor 112 provides an input triggering pulse to triac 114. The conduction of the triac 114 allows for major current flow to the primary winding 80 of the low voltage transformer 82 via inductor 78 and push-push switch 66. Conduction through the triac 114 occurs to the next half cycle of the voltage. During the positive going half cycle, the microprocessor 108 is programmed to fire the triac 114 at the same phase angle with respect to the zero crossing as it was previously fired. For the beginning of the next full cycle (the negative going half cycle), the process repeats itself. Diode 116 simply prevents a reverse bias ever being applied to the microprocessor 108 when firing the PUT 92.

During the positive half cycle, current will flow through diode 118 and 2.7 ohm resistor 120, which generates a signal through connector 106 to PIN 25 of the microprocessor 108. PIN 25 is known as "time capture," which is sometimes abbreviated TCAP. This is the instant of time at which the microprocessor knows the AC signal has gone through a zero crossing. Internally within the microprocessor is a 5 volt zener diode (not shown) that keeps the voltage inside the microprocessor 108 from exceeding the 5 volt limit. Externally, diode 122 prevents a reverse bias from being received by the microprocessor 108 so that only during the positive half cycle is a signal received in microprocessor 108. Capacitor 124 helps filter out the high frequency noise that may be received and misinterpreted as a zero crossing.

The varistor 126 is a symmetrical high voltage device that starts conducting at 150 volts. This simply provides protection against transient and false triggering. Also, high voltage capacitor 128 provides protection from line transient. Capacitor 130 and resistor 132 provide a snubber network across triac 114 to provide switching noise immunity.

Assume that the electronic circuit as shown in FIG. 5 is installed, power applied, and the main line switch (push-push switch 66) is closed. By pushing the hold down on/off switch 134, a signal is sent to PIN 12 of the microprocessor 108. Through the use of the resistor pack 136 a voltage is normally felt on PIN 12 of the microprocessor 108. However, when on/off switch 134 is closed, the microprocessor 108 remembers the receiving of a zero signal which tells the microprocessor that it can start firing the triac after the amount of time has lapsed as determined by value in resister "preset." In addition, the RC time constant and the PIN 3 signal must be within the time window which indicates that the transformer secondary 84 is connected to a load 86.

Depending upon the light intensity, different light emitting diodes 140, 142, 144, 146, 148, 150, 152 and/or 154 will be illuminated. The greater the intensity, the higher the position of the light emitting diodes from bottom to top will be illuminated. At the lowest intensity, only light emitting diode 140 would be illuminated. At the highest intensity, only light emitting diode 154 will be illuminated.

The illumination of the light emitting diodes is controlled internally within the microprocessor 108. There 85 possible light intensity levels within the microprocessor. For example, to increase from light intensity level as indicated by light emitting diode 140 to light intensity level represented by light emitting diode 142, ten steps representing ten different lighting levels must occur within the microprocessor 108.

Also, the light emitting diodes 140-154 are not illuminated 100 percent of the time. They are strobed or duty cycled from the microprocessor 108. However, to the human eye, the light emitting diodes 140-154 appear as if they are continuously illuminated.

If the intensity level of the light (i.e. power delivered to the load 86) is to be increased, the individual would simply push increase light intensity button 46 (see FIG. 1) which would close light intensity increase switch 164. Depending upon how long a person holds down light intensity increase switch 164 determines how much the light intensity will be increased as sensed by the microprocessor 108. This results in a new value being stored in microprocessor 108 register "preset." PIN 11 which connects to light intensity increase switch 164 is normally high. When light intensity increase switch 164 is closed, the ground signal indicates to the microprocessor 108 to start increasing the light intensity by changing the firing point of the triac 114. This can be seen by the operator by the increased number of light emitting diodes 140-154 that are illuminated.

Likewise, to decrease the intensity level delivered to the load 86, a person can push the decrease in light intensity button 48 (see FIG. 1) which will close the hold down light intensity decrease switch 166. The closing of light intensity decrease switch 166 delivers a zero to PIN 13 of microprocessor 108. This tells the microprocessor to start stepping down the intensity level of power delivered to load 86 by increasing the phase angle at which the triac 114 is fired. This can be visibly seen by the operator by the decreasing of the number of the light emitting diodes 140–154 that are illuminated.

The clock signal for the microprocessor 108 is received from oscillator clock 156 that has clocking capacitors 158 and 160 associated therewith. Resistor 162 provides a high resistance drain for capacitors 158 and 160. The clock 156 provides a one megahertz signal to the microprocessor 108.

Figure 6:
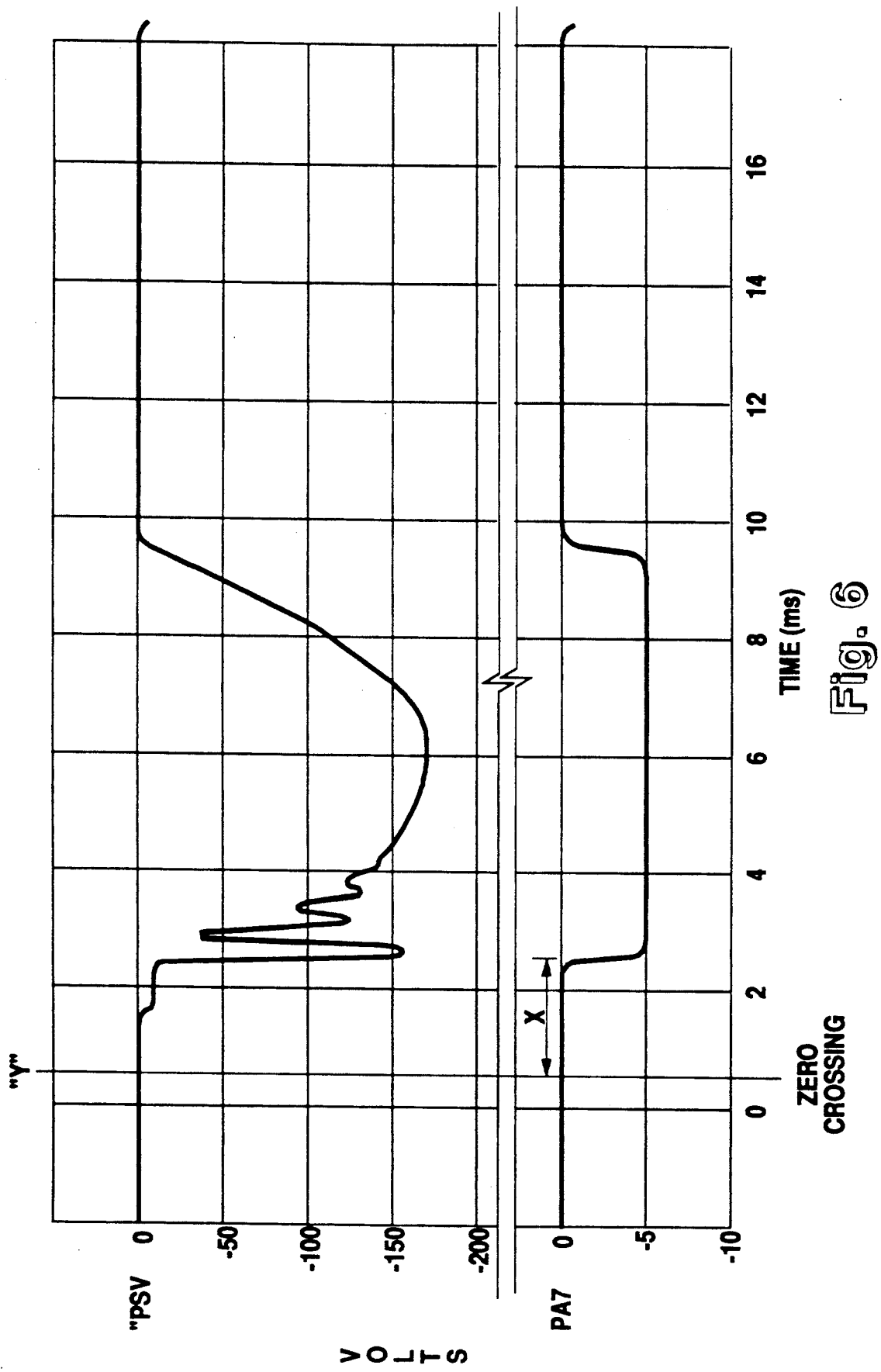
FIG. 6 is a typical wave form of the light dimmer switch when the switch is operating and the secondary winding has a load connected thereto.

Referring to FIGS. 6 and 7, a good understanding concerning the operation of the low voltage light dimming switch can be obtained. In FIG. 6, a load 86 is connected to the secondary side 84 of the low voltage transformer 82. Upon applying power a zero crossing represented by the Y axis is determined and recorded by TCAP in the microprocessor 108. At the time power capacitor 68 is fully charged as shown at the end of time interval X′, microprocessor 108 will receive a signal PA7 through PIN 3 as is represented in the lower wave form in FIG. 6. Also, the power represented by PSV on the back side of zener diode 102 is recorded in the upper wave form. In FIG. 6 everything is operating properly.

Referring to FIG. 7, a load 86 is not connected across the secondary side 84 of the low voltage transformer 82. When a zero crossing is detected as illustrated in FIG. 7 by the microprocessor 108 through TCAP, the microprocessor 108 begins recording time. At the end of time interval X, if a signal has not been received at PA 7 (PIN 3), the firing of the triac is inhibited. The upper wave form PSV represents the signal as measured on the back side of zener diode 102. The lower wave form PA7 is the signal being received at microprocessor 108. As can be seen in comparing FIG. 6 with FIG. 7, the time for receiving the signal in FIG. 6 is represented by X′, which is approximately two milliseconds. The time when the load 86 is open as represented in FIG. 7 and is shown as X is approximately 3.75 milliseconds. Therefore, the microprocessor 108, after the zero crossing, if an RC signal has not been received in approximately 3.75 milliseconds, the microprocessor will be inhibited from firing. It will not be fired again until line voltage has been disconnected at which time, hopefully, the load will be re-established.

Communications with the outside world or to other light dimming remotes is through the yellow line remote connection 20. By appropriate signals from PIN 10 of the microprocessor 108, transistor 168 may be switched on or off in a serial communication load. Diode 170 simply prevents a reverse bias across resistor 168.

The yellow line remote connection 20 is a two way communications bus. Incoming signals are received through 100 kilo-ohm resistor 172 to PIN 9 of microprocessor 108. Diode 174 provides a reverse bias shunt to ground. Through PIN 9 of microprocessor 108 incoming signals from yellow line remote connection 20 can be serially communicated to the microprocessor 108. For example, if there is a three way connection between two light dimming switches, the status of the remote dimmer can be communicated to the microprocessor 108 via the yellow line remote connection 20.

A voltage regulator 176 receives the charge voltage across power capacitor 68 and one side of the line voltage VCC. Voltage regulator capacitors 178 and 180 connect the voltage regulator 176 between ground and the unregulated power VCC. The ground (other than chassis ground at green line chassis ground 18) is a floating ground. The voltage regulator 176 may be a single chip, model MC79L05 sold by Motorola.

Because the voltage regulator 176 is contained in the same housing with the light dimming switch, the voltage regulator 176 may be used as a temperature sensing device. The voltage regulator 176 has built internally a temperature sensor so that if it reaches approximately 180 degrees centigrade, the sensor will trip, thus removing power from microprocessor 108, which in turn will stop sending the signal that fires the triac 114. This will stop current flow through the light dimming device. What is occurring is the temperature sensor internally built within the voltage regulator 176 is being used for the entire light dimmer, not just the regulator itself.

In the present design, it should be realized that all voltages are below line voltage. Therefore, all voltages being used in the present system are negative voltages. VCC would typically be minus 5 volts DC.

For a three way installation, the installer should check to find out which is the main power lead that is coming into the three way switch box and connect black line voltage input 14 thereto. In other words, the full system as shown in FIG. 5 would be installed. The yellow line remote connection 20 would then connect to the remote location of the three way light dimming switch.

The remote switch would have all of the component parts to the right of connector 106, but would not have the circuitry shown to the left of connector 106. In other words, a microprocessor (not shown) in the remote location would be identical to the microprocessor as shown in FIG. 5. Through the yellow line remote connection 20, the two microprocessors would communicate with each other. Hence, when a person enters a room and pushes the hold down on/off switch 34 at either location, it will be communicated to the respective microprocessors 108. Also when a person enters a room and pushes down the hold down light intensity increase switch 164, that likewise will be communicated to both microprocessors 108 to increase the intensity of the light, i.e. earlier firing time of the triac 114. Similarly when the hold down light intensity decrease switch 166 is pressed at either location, that likewise will be communicated to the respective microprocessors 108. An appropriate signal would again be sent to triac 114 to delay the firing time, thereby decreasing the light intensity.

A total of five remote controls can be used in conjunction with light dimming switch as shown in FIG. 5. In each of the remote locations, only the circuitry shown on the right hand side of connector 106 needs to be included. The microprocessor 108 will continually poll remote 20 to determine if there is a change in condition. The change in condition tells the microprocessor 108 whether to turn the light on, off, increase intensity, or decrease intensity. That can be controlled from any one of the different locations. The yellow remotewire 20 is a "wired-or" circuit in that any of the remotes or the master itself may take control and send signals. At this time all of the additional devices listen like a party line.

I claim:

1. A low voltage dimmer circuit for delivering power to a load through a low voltage transformer having a primary side and a secondary side, said low voltage light dimmer circuit connecting between an AC power line and said load, said low voltage dimmer circuit comprising:
   triac connected between said AC power line and said load to permit current flow therethrough during any half cycle of AC power upon receiving a gate signal;
   charging means connected across said triac to charge to a predetermined voltage within a given period of time after zero crossing of said AC power if said load is connected across said secondary side of said low voltage transformer, said charge to said predetermined voltage taking longer than said given period of time if no said load is connected across said secondary side of said low voltage transformer;
   computer means receiving said AC power to determine the time of said zero crossing and expiration of said given period of time, said computer means supplying said gate signal to said triac;
   during operation of said low voltage light dimmer circuit said gate signal being sent for selected said half cycle to trigger said triac into conduction if said predetermined voltage is reached within said given period of time.

2. The low voltage light dimmer as recited in claim 1 wherein power for said computer means is provided by said charging means via voltage regulator means.

3. The low voltage light dimmer as recited in claim 2 being contained in a common housing, said voltage regulator means includes temperature sensor means which activates if a predetermined temperature is exceeded, said temperature sensor means removing power to said computer means if said predetermined temperature is exceeded, said computer means no longer supplying said gate signal to said triac upon receiving said temperature signal.

4. The low voltage light dimmer recited in claims 1 or 3 wherein said computer means connects to an ON/OFF switch, intensity increase switch and intensity decrease switch; said ON/OFF switch commanding said computer means to permit/stop firing of said triac by controlling said gate signal; said intensity increase switch commanding said computer means to advance said gate signal with respect to said zero crossing; said intensity decrease switch commanding said computer means to retard said gate signal with respect to said zero crossing.

5. The low voltage light dimmer as recited in claim 4 further includes a plurality of display means, said display means being activated by said computer means to visually indicate different intensity levels.

6. The low voltage dimmer as recited in claim 4 wherein said computer means has at least one remote input, said remote input being adapted to receive remote serial commands to said computer means which remote serial commands function the same as said ON/OFF switch, said increase intensity switch and/or said decrease intensity switch.

7. The low voltage dimmer as recited in claim 6 having disconnect means between said computer means with said ON/OFF switch, said intensity increase switch and said intensity decrease switch on a first side of said disconnect means and said triac with said charging means on a second side of said disconnect means, said disconnect means allowing remote switches to be identical except said triac and charging means have been eliminated making said remote switch a slave.

8. The low voltage light dimmer as recited in claim 1 including full disconnect switch between said AC power line and said load.

9. A method of controlling power delivered from an AC power line through a low voltage circuit to a load via a low voltage transformer having a primary side and a secondary side, said method including the following steps:
   connecting a triac between said AC power and said load to permit current flow therethrough during any half cycle of AC power upon receiving a gate signal;
   charging a charge storing device connected across said triac to a predetermined voltage after zero crossing of said AC power, said predetermined voltage being reached in less than a predetermined time only if said load is connected to said secondary side of said low voltage transformer;
   using a computer to measure time from said zero crossing to said charging of said predetermined voltage so that if said predetermined voltage is reached in said predetermined time said computer will supply said gate signal to said triac.

10. The method of controlling power to a load as recited in claim 9 including a step of sensing temperature in voltage regulator for said computer, locating said voltage regulator and said computer in a common housing so that when a maximum temperature in said housing is exceeded, power is removed from said computer so that said computer no longer supplies said gate signal.

11. The method of controlling power to a load as recited in claim 9 including the following additional steps:
   commanding said computer through an ON/OFF switch to permit/stop supplying said gate signal;
   increasing power by advancing said gate signal upon closing a power increase switch; and
   decreasing power by retarding said gate signal upon closing a power decrease switch.

12. The method of controlling power to a load as recited in claim 11 includes a displaying step, during said displaying step a plurality of display means being activated by said computer with more representing more power and less representing less power.

13. The method of controlling power to a load as recited in claim 11 includes the following steps:
   providing at least one remote input to said computer to perform said steps of:
   (a) commanding said computer to permit/stop supplying said gate signal;
   (b) increasing power by advancing said gate signal; and
   (c) decreasing power by retarding said gate signal.

* * * * *